United States Patent [19]

Fidric

[11] Patent Number: 4,867,567
[45] Date of Patent: Sep. 19, 1989

[54] RING LASER GYRO FRAME DESIGN RESISTANT TO THERMAL GRADIENT EFFECTS

[75] Inventor: Bernard G. Fidric, Woodland Hills, Calif.

[73] Assignee: Litton Systems, Inc., Woodland Hills, Calif.

[21] Appl. No.: 88,079

[22] Filed: Aug. 21, 1987

[51] Int. Cl.$^4$ .............................................. G01C 19/64
[52] U.S. Cl. ...................................... 356/350; 372/94
[58] Field of Search ........................... 356/350; 372/94

[56] References Cited

U.S. PATENT DOCUMENTS 4,190,364  2/1980  Ljung et al. ...................... 356/350
4,705,398  11/1987  Lim et al. ............................ 356/350

Primary Examiner—Vincent P. McGraw
Attorney, Agent, or Firm—Poms, Smith, Lande & Rose

[57] ABSTRACT

A ring laser gyro is shown which generates two or more laser beams that travel through a gain medium. The laser produces two bias components, one due to Langmuir flow and the second due to a thermal gradient. The invention uses a symmetrically mounted restriction in the gain portion of the laser passageways to control the flow of the gain medium. The non-gain portion of the passageways is also enlarged to reduce the effects of a thermal gradient on the flow of the medium.

17 Claims, 2 Drawing Sheets

RING LASER GYRO FRAME DESIGN RESISTANT TO THERMAL GRADIENT EFFECTS

BACKGROUND OF THE INVENTION

1. Field of the Invention

This invention relates to ring laser gyros and, more particularly, to an improved gyro having a reduced sensitivity to bias caused by Langmuir flow and thermal gradients.

2. Description of the Prior Art

Ring laser gyros use two or more counter-propagating light beams of predetermined frequencies to measure the rotational rate about a sensitive axis of the ring as a function of the difference in frequency, i.e., beat frequency, between the counter-propagating beams. The means normally used to produce such counter-propagating beams comprise an electric DC discharge in a gain medium, such as a suitable mixture of helium and neon.

The gas medium will flow during the operation of the ring laser gyro. This flow is caused by two components: an electro-phoretic force directed along the DC excited plasma discharge, causing a Langmuir flow; and a thermal gradient along the gain tube.

The interaction of the light beams with the moving medium gives rise to a frequency shift of the counter-propagating beams. The beam propagating in the direction of the gas flow sees an optical length which is different from that of the beam propagating in the direction opposite to the gas flow. The flow then gives rise to a bias on the beat frequency between the counter-propagating beams. Output information that is gained by rotation of the ring path may thus contain an error due to the bias caused by the plasma flow.

One gyro configuration used to correct the output bias due to the Langmuir flow places a restriction in the passageway of the ring. This configuration is shown in a patent application by Michael Holz titled Ring Laser Gyro, Ser. No. 412,442, filed Aug. 27, 1982, which was filed, as a file wrapper continuation, Ser. No. 948,426, on Dec. 31, 1986. The Holz application places a restriction asymmetrically within the laser passageways.

SUMMARY OF THE INVENTION

It has been discovered that the accuracy of the ring laser gyro is limited by a bias caused by thermal gradients within the laser. This is a bias in addition to the bias caused by Langmuir flow. The thermal gradients may be caused by many factors including the operating range of ambient temperatures to which the laser is exposed and the internal temperature differences between points within the laser caused by anode heating.

The invention provides for a means of controlling the plasma flow resulting from the thermal gradients by providing an optimal ratio of plasma flow conductivity between the gain tube and the non-gain tube. At this optimal ratio, the plasma flow, and therefore the thermal gradient, will not effect the operation of the ring laser gyro.

One embodiment controls the plasma flow by placing a restriction symmetrically within the gain tube. U Another embodiment consists of enlarging the non-gain tube, thus causing the desired greater conductivity of the non-gain tube. The enlarged non-gain tube encourages the gas to flow in the non-gain tube where it will not effect noticeably the frequency of the laser beams.

DESCRIPTION OF THE DRAWINGS

A better understanding of this invention may be had by reference to the specification and drawings, wherein.

DESCRIPTION OF THE PREFERRED EMBODIMENT

Figure 1:
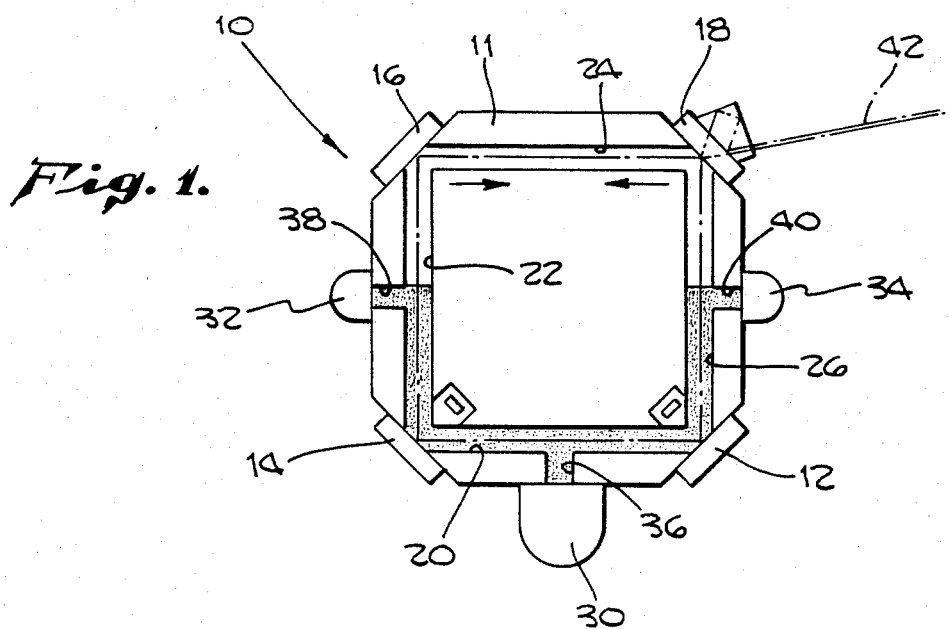
FIG. 1 is a schematic diagram showing a ring laser gyro with the gain tube marked by a grid pattern and the non-gain tube unmarked.

Referring now to FIG. 1, there is shown a ring laser gyro system 10 mounted in a laser block 11 which embodies the principles of the present invention. A ring laser path is produced by mounting mirrors 12, 14, 16 and 18 on each corner of the block 11. Passageways 20, 22, 24 and 26 are placed within the block 11 between mirrors 12, 14, 16 and 18 to provide a closed passageway which contains a laser gain medium, such as helium and neon, suitable for procuring counter-propagating laser beams of predetermined frequency. The beams of electromagnetic energy are propagated in the passageways thus defined by generating an electrical discharge in the gain medium, as is well known in the art.

The electrical discharge is produced between a central cathode 30 and anodes 32 and 34. Cathode 30 may be hermetically sealed to the center of one of the side faces of block 11 of the ring laser gyro 10 adjacent to passageway 20. The cathode 30 is joined to the passageway 20 through auxiliary passage 36.

Anodes 32 and 34 each comprise a conductive electrode coupled to the ring laser passageways 22 and 26 through auxiliary passages 38 and 40, respectively.

Between each anode and the cathode, laser activity produces counter-propagating laser beams as shown by the shaded passageways 20, 22, and 26 in FIG. 1. This shaded area is known as the gain tube where the laser activity takes place. The beams thus produced propagate through all passageways including a non-gain tube, which is located between anodes 32 and 34 in the unshaded passageways 22, 24, and 26. The ring laser gyro generates an output of combined beams at 42 through a partially transmitting mirror 18. This output is then analyzed to determine the change in frequency due to a change in position about the sensitive axis of the ring laser gyro, as is known.

A frequency shift not correlating to the rotation of the ring laser gyro 10 may be caused by the flow of the helium and neon gases that comprises the laser medium. This gas flow changes the optical path length through which the laser beams are propagated causing an undesired bias.

The bias is produced by two sources. One is known as Langmuir flow. The electrical discharge of the laser activity causes a charge imbalance within the gain tube, IU thereby causing the Langmuir flow. This gas flow causes the change in frequency of the laser beams, as discussed above. On solution to this problem has been discussed in the patent application by Holz, identified above.

A second source of laser bias is caused by a thermal gradient. The ring laser gyro 10 may be subjected to an operating range of 150° C., or greater. This temperature change causes thermal gradients within the laser which, in turn, causes the gas medium to flow. Since previous attempts to control the temperature gradients across a gyro have been cumbersome and ineffective, ring laser gyros of the prior art have been limited by their bias sensitivity to thermal gradients.

Figure 2:
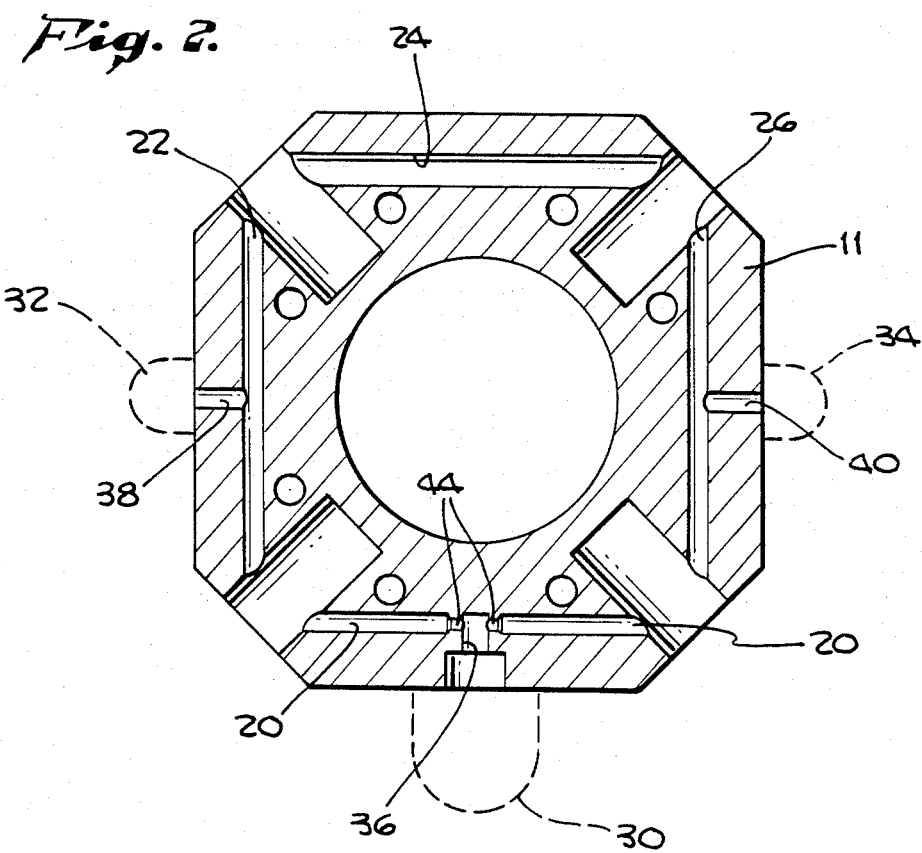
FIG. 2 shows a ring laser gyro in cross-section with a "T" shaped connection between the cathode and the laser passageways.

Referring now to FIG. 2, the laser block 11 is shown in greater detail. It will be seen that a restrictive aperture 44 is symmetrically placed at the point of the symmetry formed by the intersection of passageway 36 and passageway 20. This point of symmetry is formed where the crossed passages or legs join to create a T-shaped configuration. The restrictive aperture 44 is mounted at the center of passageway 20, which is also a point equal in distance from anodes 32 and 34.

The restriction 44 could be mounted within the teachings of this invention, at two points within passageway 20 equal distance from the T-shaped junction of passageway 20 and passage 36. Further it will be understood that the counter-propagating laser beams may also be generated by a single anode mounted at passage 36 and two cathodes mounted at passages 32 and 34.

In FIG. 2 passageway 24 is enlarged. This encourages the gas flow caused by thermal gradients to move with the non-gain tube. By increasing the size of the diameter of the non-gain tube, or decreasing the size of the restrictive aperture 44, or both, until the flow conductivity ratio of the gain tube to the non-gain tube is less than unity there will be no net movement of the gases within the gain tube. In the preferred embodiment, the ratio of flow conductivity in the gain tube to flow conductivity in the non-gain tube is one to three plus or minus one (1:3±1).

An enlarged non-gain tube is referred to in Holz to reduce diffraction losses of the circulating laser beams and to ease manufacturing tolerances. However, the enlarged non-gain tube is not symmetrically enlarged as within the present invention. Further, the enlarged non-symmetrical, non-gain tube of Holz is achieved with a flow conductivity ratio of 1 to 1.5 or less. The embodiment suggested by the present invention is larger than presently used and achieves a function not previously considered. By symmetrically placing the restriction 44 and/or symmetrically designing the diameters of the gain tube and non-gain tube to achieve the proper conductivity ratio, the ring laser gyro 10 will have no net movement of gas molecules due to thermal gradients.

Figure 3:
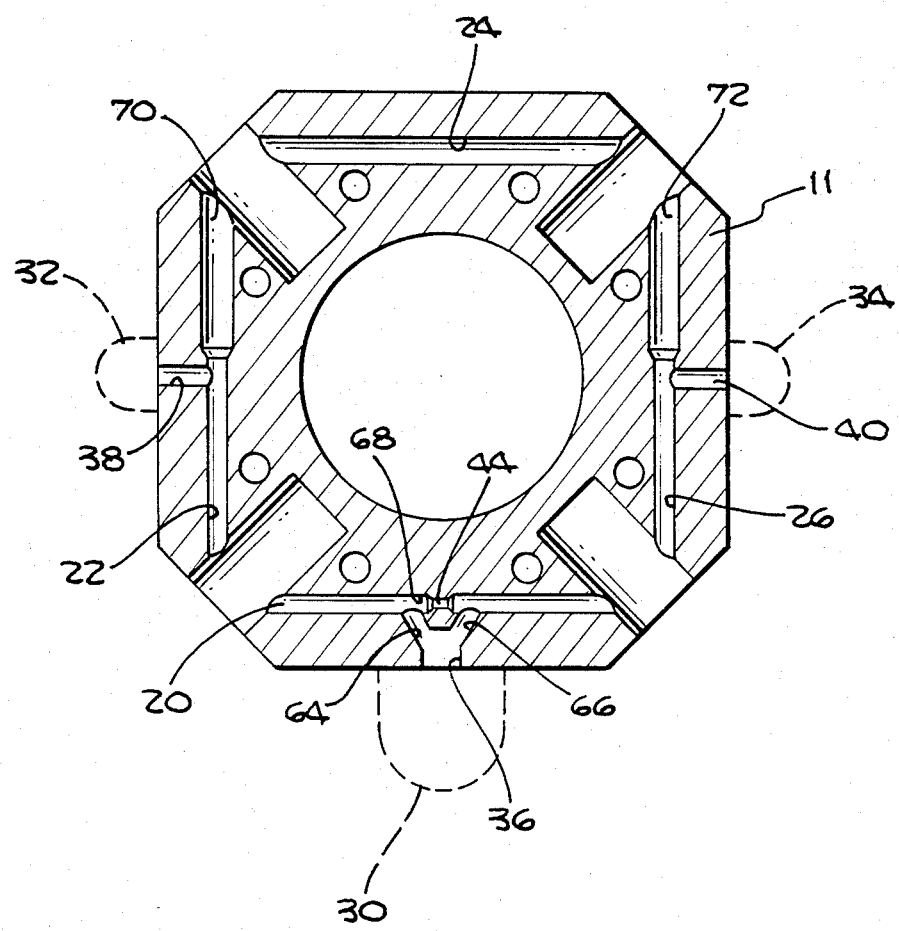
FIG. 3 illustrates a ring laser gyro again in cross-section showing a "Y" shaped connection between the cathode and the laser passageways.

Referring to FIG. 3, a second embodiment of laser block 11 is shown using a Y-shaped junction between passage 36 and passageway 20 and an enlarged gain tube which extends beyond passageway 24 into passageways 22 and 26. It will be seen that passage 36 divides into two legs 64 and 66 with the single leg 36 joined to cathode 30 and the two legs 64 and 66 joined to passageway 20 on either side of the restrictive aperture 44 to create the Y-shape. Aperture 44 is thus mounted in a passageway 68 for the laser beams only. Little or no laser activity takes place in the aperture 44. The non-gain tubes are fully enlarged in FIG. 3. That is, in addition to enlarging passageway 24, that portion of passageways 22 and 26 above the passages 38 and 40, respectively, are also enlarged as shown at 70 and 72 in FIG. 3. Since flow conductivity is proportional to diameter squared divided by length, the longer, large diameter non-gain tubes 70, 24, and 72 allow for the desired conductivity without an excessively large diameter for passageway 24.

I claim:

1. In a ring laser gyro including at least two laser means for generating counter rotating laser beams within the laser plasma that fills the laser passageways, said laser passageways including a gain tube in which laser activity takes place and a non-gain tube, said at least two laser mean creating a laser bias in the output of said ring laser gyro, the improvement comprising:
    said laser means symmetrically mounted within said laser passageways for symmetrically generating said at least two laser beams; and
    said laser passageways including symmetrically mounted means therein for creating a ratio of laser plasma flow conductivity in said gain tube to laser plasma flow conductivity in said non-gain tube that is less than unity, whereby said laser in the output of said ring laser gyro is reduced.

2. In a ring laser gyro, as claimed in claim 1, wherein:
    said symmetrically mounted means in said passageways is restrictive means mounted in said gain tube of said passageways for controlling laser plasma flow.

3. In a ring laser gyro, as claimed in claim 1, wherein:
    said symmetrically mounted means in said passageways include a symmetrically enlarged non-gain tube compared to said symmetrical gain tube.

4. In a ring laser gyro, as claimed in claim 1, wherein:
    said symmetrically mounted means creating said ratio creates a ratio of approximately one to three plus or minus one such that said ring laser gyro is relatively insensitive to a thermal gradient.

5. In a ring laser gyro, as claimed in claim 2, additionally comprising:
    one cathode and two anodes symmetrically mounted within said passageways to form said at least two laser means and define said gain tube; and
    said restrictive means mounted at a point of symmetry symmetrical to said cathode and said anodes.

6. In a ring laser gyro, as claimed in claim 2, additionally comprising:
    two cathodes and one anode symmetrically mounted within said passageways to form said at least two laser means and define said gain tube; and
    said restrictive means mounted at a point of symmetry symmetrical to said cathodes and said anode.

7. In a ring laser gyro, as claimed in claim 5, wherein:
    said non-gain tube formed in said passageways between said anodes, which passageways exclude said cathode, is formed larger than said gain tube.

8. In a ring laser gyro, as claimed in claim 6, wherein:
    said non-gain tube formed in said passageways between said cathodes, which passageways exclude said anode, is formed larger than said gain tube.

9. In a ring laser gyro, as claimed in claim 5, additionally comprising:
    a connection between said cathode and said gain tube having a T-shape formed by crossed legs; and
    said restrictive means mounted in said T-shape connection at the point where said legs cross to for said point of symmetry symmetrical to said cathode and said anodes.

10. In a ring laser gyro, as claimed in claim 6, additionally comprising:
    a connection between said anode and said gain tube having a T-shape formed by crossed legs; and
    and said restrictive means mounted in said T-shape connection at the point where said legs cross to form said point of symmetry symmetrical to said anode and said cathodes.

11. In a ring laser gyro, as claimed in claim 5, additionally comprising:
a connection between said cathode and said gain tube having a Y-shape with two legs of said Y-shaped connection connected to said gain tube and the single leg of said Y-shape connected to said cathode, said restrictive means symmetrically mounted between said two legs of said Y-shaped connection.

12. In a ring laser gyro, as claimed in claim 6, additionally comprising:
a connection between said anode and said gain tube having a Y-shape with two legs of said Y-shaped connection connected to said gain tube and the single leg of said Y-shape connected to said anode, said restrictive means symmetrically mounted between said two legs of said Y-shaped connection.

13. In a ring laser gyro, as claimed in claim 2, additionally comprising:
two cathodes and one anode symmetrically mounted within said passageways to form said at least two laser means; and
at least a pair of said restrictive means mounted within said gain tube of said passageways equidistant from a point of symmetry symmetrical to said cathodes and said anode.

14. In a ring laser gyro, as claimed in claim 2, additionally comprising:
two anodes and one cathode symmetrically mounted within said passageways to form said at least two laser means; and
at least a pair of said restrictive means mounted within said gain tube of said passageways equidistant to said point of symmetry symmetrical to said anodes and said cathode.

15. In a ring laser gyro including at least two laser means for generating counter rotating laser beams within laser passageways having restrictive means within said passageways for reducing laser bias, the improvement comprising:
said laser means symmetrically mounted within said laser passageways for symmetrically generating said laser beams in a gain passageway;
said restrictive means mounted at a point of symmetry within said gain passageway with respect to said said laser means, wherein said ring laser gyro is insensitive to a thermal gradient.

16. In a ring laser gyro, as claimed in claim 15, wherein:
said passageways include gain and non-gain passageways; and
said non-gain passageways are larger in size than said gain passageways.

17. In a ring laser gyro, as claimed in claim 16, wherein:
the ratio of the flow conductivity of said non-gain passageways to said gain passageways is approximately three plus or minus one to one.

* * * * *